United States Patent [19]

Mills

[11] Patent Number: 4,682,782
[45] Date of Patent: Jul. 28, 1987

[54] SHOPPING CART WITH IMPROVED BABY SEAT

[75] Inventor: Frank Mills, Rockford, Ill.

[73] Assignee: Tote-Cart Company, Rockford, Ill.

[21] Appl. No.: 928,716

[22] Filed: Nov. 7, 1986

Related U.S. Application Data

[63] Continuation of Ser. No. 754,705, Jul. 15, 1985, abandoned.

[51] Int. Cl.⁴ .............................................. B62B 3/00
[52] U.S. Cl. ............................... 280/33.99 B; 297/463
[58] Field of Search ................. 280/33.99 B, 33.99 R, 280/33.99 F, 33.99 S, 33.99 H; 297/217, 232, 463

[56] References Cited

U.S. PATENT DOCUMENTS

| | | | |
|---|---|---|---|
| Re. 25,616 | 7/1964 | Stanley | 280/33.99 |
| 3,057,635 | 10/1962 | Ciborowski | 280/33.99 B |
| 3,437,176 | 4/1969 | Ruttenberg et al. | 280/33.99 B |
| 3,503,622 | 3/1970 | Romero | 280/33.99 |
| 3,645,554 | 2/1972 | Von Stein et al. | 280/33.99 R |
| 3,787,063 | 1/1974 | Oliver | 280/33.99 H |
| 3,789,957 | 2/1974 | Close | 186/1 AC |
| 3,815,932 | 6/1974 | Ruger | 280/33.99 F |
| 4,067,591 | 1/1978 | Celms | 280/33.99 S |
| 4,116,456 | 9/1978 | Stover et al. | 280/33.99 B |
| 4,118,044 | 10/1978 | Celms | 280/33.99 F |
| 4,273,346 | 6/1981 | Rehrig | 280/33.99 F |
| 4,423,882 | 1/1984 | Stover et al. | 280/33.99 B |
| 4,537,413 | 8/1985 | Rehrig | 280/33.99 B |

FOREIGN PATENT DOCUMENTS

| | | | |
|---|---|---|---|
| 3111616 | 10/1982 | Fed. Rep. of Germany | 280/33.99 B |
| 457154 | of 1968 | Switzerland | 280/33.99 B |

*Primary Examiner*—John J. Love
*Assistant Examiner*—Eric D. Culbreth
*Attorney, Agent, or Firm*—Wood, Dalton, Phillips, Mason & Rowe

[57] ABSTRACT

An over-the-counter shopping cart having an improved panel structure for selectively defining a baby leg hole closure and baby seat back. The panel structure includes a sheet panel serving as an improved support for the baby and a support for supporting small articles in the rear portion of the basket, when desired. In the leg hole closure arrangement, the panel structure provides two panels overlying the leg holes. Selective disposition of the panel structure in either of the two desired dispositions is facilitated by the novel arrangement.

20 Claims, 4 Drawing Figures

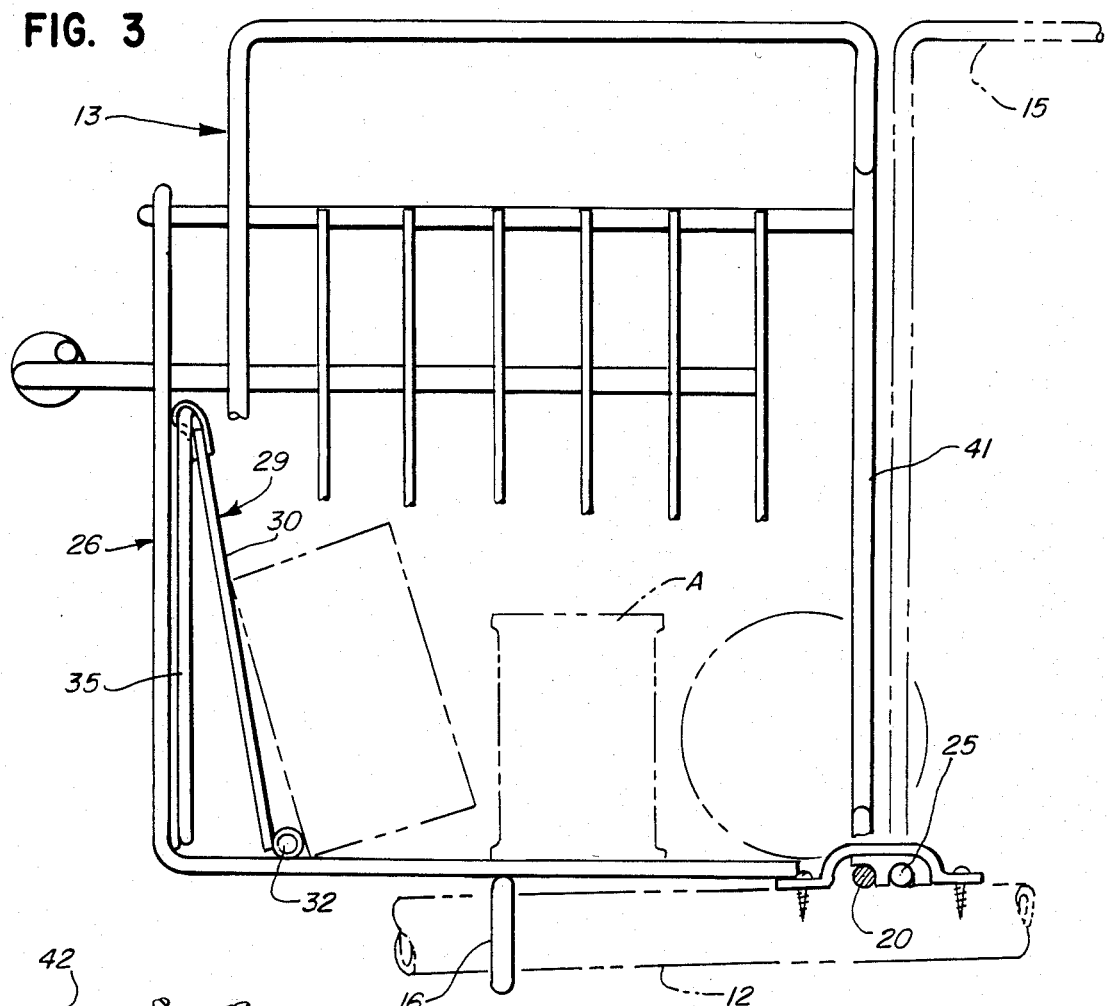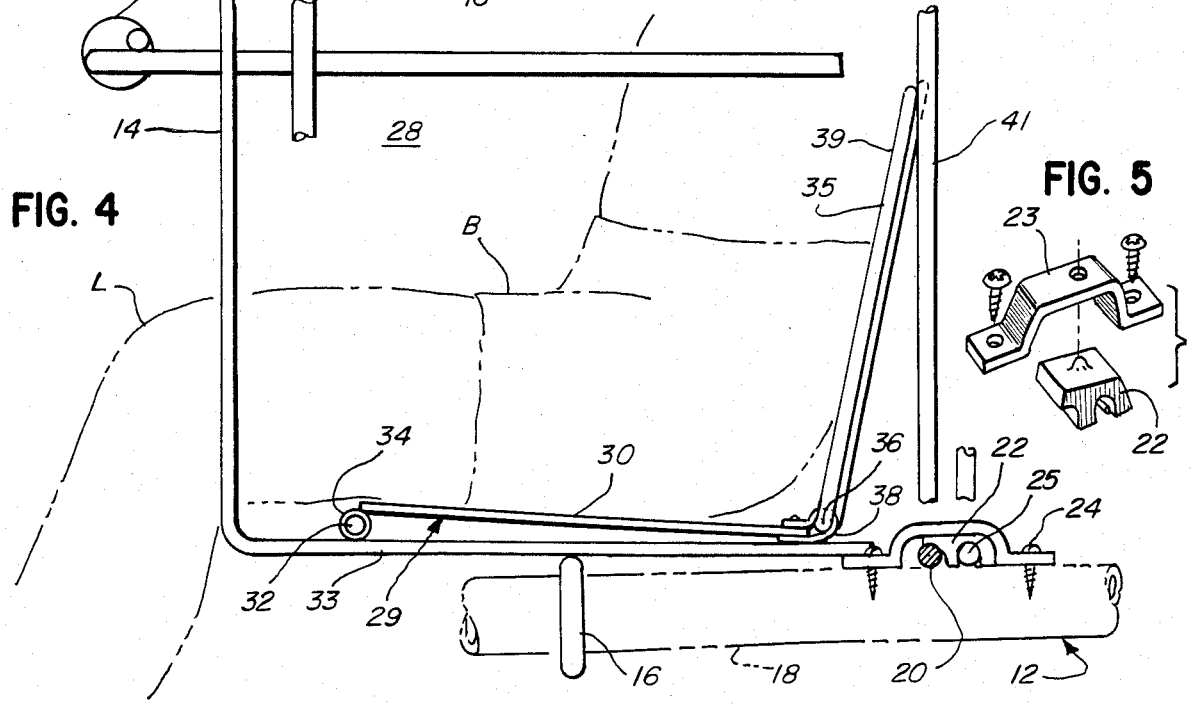

SHOPPING CART WITH IMPROVED BABY SEAT

This application is a continuation of application Ser. No. 754,705, filed July 15, 1985, now abandoned.

TECHNICAL FIELD

This invention relates to shopping carts and in particular to a baby seat construction for use in a shopping cart.

BACKGROUND ART

One form of grocery cart comprises an over-the-counter cart wherein the basket is elevated substantially above a lower base portion. One example of such a cart is illustrated in U.S. Pat. No. 3,503,622 of Victor R. Romero. As shown therein, a fixed receptacle is rigidly mounted at the rear of the cart and a forwardly projecting movable receptacle is hingedly mounted to the frame forwardly of the fixed receptacle. A panel is movably mounted on the rear receptacle for movement from a position wherein it covers the leg-receiving opening to a position forwardly where it forms a seat back for a baby seated in the receptacle on the bottom wall thereof. The baby seat structure includes a panel having an upper portion connected to an arm which is pivotally mounted to the sides of the baby seat portion of the cart so as to be swingable from a rearward position wherein the panel closes the leg holes in the rear wall of the basket, and a forward position wherein the panel hangs downwardly from the arm to define a backrest for the baby sitting in the baby seat.

DISCLOSURE OF INVENTION

The present invention comprehends an improved baby seat construction for use in an over-the-counter shopping cart wherein a bifold panel structure is utilized to selectively define a leg hole closure, a seat portion, and a back rest portion of the baby seat construction in different arrangements of the bifold panel.

More specifically, the invention comprehends the provision in a shopping cart having a wheeled frame and a basket carried on the frame and defining a rear seat portion and an upright rear wall having leg holes for passing rearwardly therethrough the legs of a baby sitting on the seat portion in a baby seat space at the rear of the basket, an improved baby seat construction including wall means mounted to the basket for selectively defining (a) a seat back upstanding from the rear seat portion for supporting the back of a baby sitting in the baby seat space, with the legs of the baby extending rearwardly through the leg holes, and (b) a downwardly hanging leg hole closure for closing the leg holes with the baby seat space opening forwardly in the basket whereby the entire basket may be used to receive objects and passage of such objects rearwardly through the leg holes from the basket is effectively prevented.

In the illustrated embodiments, stop means are provided on the basket at a front end of the baby seat space. The eat back engages the stop means in the arrangement of the structure to define the baby seat.

In the illustrated embodiment, the panel connected to the basket comprises a substantially continuous horizontal support surface overlying the rear seat portion of the basket for supporting the buttocks of a baby sitting in the baby seat.

The substantially continuous panel further defines means for supporting small objects in the rear portion of the basket adjacent the handle.

In the illustrated embodiment, the bifold panel includes a first panel pivotally connected to the basket adjacent the rear wall and a second panel pivotally connected to the first panel.

The pivotal connection of the first panel to the basket is spaced forwardly of the rear wall of the basket so as to permit the second panel to be folded downwardly from the top of the first panel to lie against the rear wall of the basket in the disposition wherein the leg holes are closed thereby.

The baby seat construction of the present invention is extremely simple and economical of construction while yet providing for an improved facilitated use, long troublefree life, and effectively positive closure of the leg holes and effectively positive support of the back of the baby in the two selected dispositions of the structure.

BRIEF DESCRIPTION OF THE DRAWING

Other features and advantages of the invention will be apparent from the following description taken in connection with the accompanying drawing wherein:

FIG. 3 is a fragmentary vertical section illustrating the arrangement of the panel structure enclosing the rear leg holes of the basket;

FIG. 4 is a fragmentary vertical section illustrating the arrangement of the panel structure in forming a seat back for a baby sitting in the baby seat portion of the basket; and FIG. 5 is an exploded perspective view of means for pivotally connecting the movable front portion of the basket to the supporting frame.

BEST MODE FOR CARRYING OUT THE INVENTION

Figure 1:
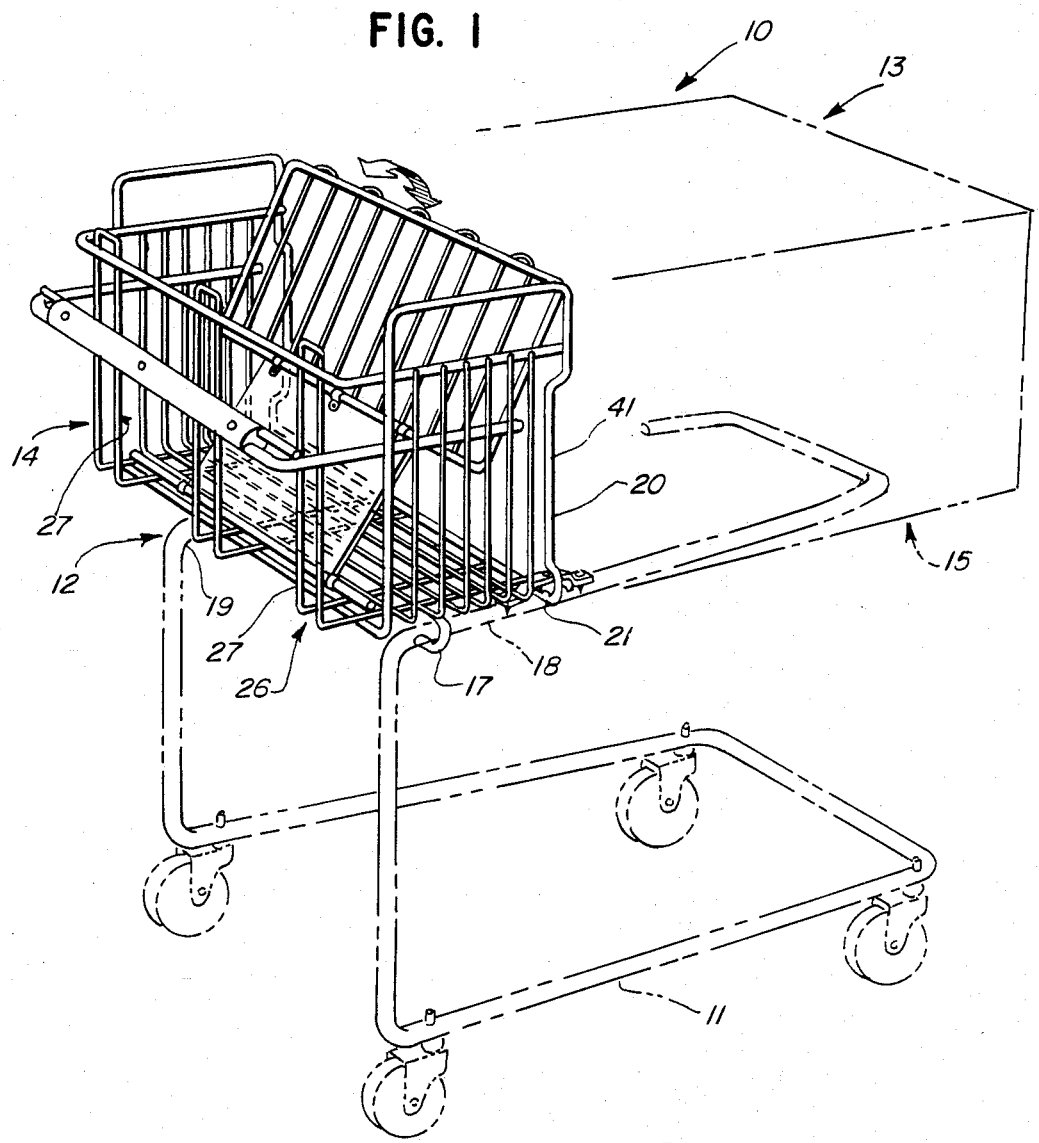
FIG. 1 is a fragmentary perspective view of a shopping cart embodying the invention.

In the illustrative embodiment of the invention as disclosed in the drawing, a shopping cart generally designated 10 is shown to comprise an over-the counter cart having a wheeled base 11 including an upper cantilevered, forwardly extending basket support 12.

An over-the-counter basket generally designated 13 is mounted to the basket support 12 and includes a rear seat portion 14 and a front portion 15.

Basket seat portion 14 is fixedly secured to the basket support 12 by a rear support wire 16 having opposite ends 17 extending about horizontally forwardly extending legs 18 and 19 of the basket support 12 at opposite sides of the basket. Seat portion 14 further defines a front wire 20 having a horizontal bottom portion 21 extending through a pair of retainers 22 secured to the opposite legs 18 and 19 of the support 12 by straps 23 and screws 24.

Front portion 15 of the basket is pivotally mounted so as to swing from a horizontal, forwardly extending position resting on support 12, as shown in broken lines in FIG. 1, to an upright storage position in which the seat portion 14 is received in a lower portion of the upright front portion in the conventional manner. Such pivotal connection of the front basket portion 15 to the support 12 is effected by the provision of a rear wire 25 pivotally retained to the support legs 18 and 19 by the respective retainers 22, as illustrated in FIG. 4.

The seat portion 14 of basket 13 opens forwardly into the rear of the front portion 15, whereby the entire basket 13 may be used to receive articles. The rear wall generally designated 26 of basket 13 defines a pair of leg holes 27 through which the legs L of a baby B seated in the baby seat space 28 in seat portion 14 extend. When utilizing the entire basket 13 for receiving articles, it is desirable to close the leg holes 27 to prevent inadvertent passing of the articles outwardly through the holes. For this purpose, a bifold panel structure generally designated 29 is utilized to selectively close the leg openings, as illustrated in FIG. 3.

Figure 2:
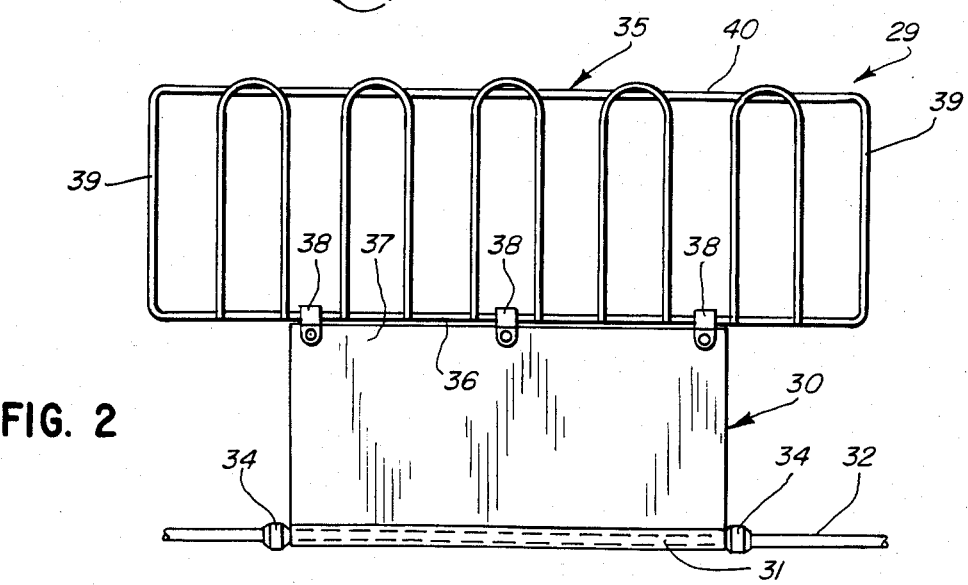
FIG. 2 is an elevation of the bifold panel structure embodying the invention in an extended disposition.

As shown in FIG. 2, panel structure 29 includes a first panel 30 having one edge portion 31 pivotally connected to a cross wire 32 on the bottom wall 33 of the basket seat portion 14 by a pair of tubular pivots 34 encircling the wire 32, as illustrated in FIG. 2.

Panel structure 29 further includes a second panel generally designated 35 having an edge wire 36 pivotally connected to the distal edge 37 of panel 30 by pivot connectors 38.

As further illustrated in FIG. 2, second panel 29 includes a pair of side wires 39 and a distal end wire 40. The front wires 20 of seat portion 14 include inset vertical midportions 41, as best seen in FIG. 1. When it is desired to use the space 28 to receive a baby B in lieu of the articles A illustrated in FIG. 3, panel structure 29 is repositioned to the arrangement illustrated in FIG. 4, wherein the second panel 39 is swung rearwardly to rest against the inset side wire portions 41, with the panel 30 extending generally horizontally in overlying relationship to the bottom wall 33 of the basket seat portion 14.

Panel 30 of the bifold structure 29 is preferably a continuous sheet member. In the illustrated embodiment, panel 30 is formed of a sheet of synthetic resin. Thus, panel 30 defines an improved seat surface for the baby, as shown in FIG. 4, when the panel structure 29 is utilized to define the baby seat arrangement.

Further, panel 30 cooperates with panel 38 in defining a double closure means for the leg holes, as illustrated in FIG. 3, when the panel structure 29 is utilized for that purpose.

At times, a user of the shopping cart may utilize the panel structure 29 in the baby seat configuration solely to provide a small receiving space 28 where only a small number of articles are to be placed in the cart. At such time, the sheet panel 30 defines improved means for supporting small articles and the like on the bottom of the space 28 for further facilitated use of the cart in shopping.

As seen in FIG. 3, cross wire 32 is spaced forwardly of the basket rear wall 26 so as to permit the panel 30 to be angled rearwardly upwardly whereby the distal panel 35 hangs vertically downwardly across the rear wall 26. Similarly, the length of panel 30 is preselected relative to the disposition of cross wire 32 so that the wire 36 of panel 35 is disposed forwardly of the plane of upright wire portions 41, permitting the panel 35 to be inclined upwardly rearwardly from wire 36 to the engagement thereof with the wire portions 41, as illustrated in FIG. 4.

Panel structure 29 may be readily selectively disposed in either of the leg hole closure position of FIG. 3 or baby seat defining position of FIG. 4 by facilitated manipulation of the panels 30 and 35. Thus, to reposition the panel structure 29 from the leg hole closure position of FIG. 3 to the seat forming disposition of FIG. 4, the user simply swings the folded structure about wire 32 to bring panel 30 into overlying relationship with the bottom 33 of the rear basket portion 14. Concurrently, the distal panel 35 is swung to the forwardly inclined upright position to engage the wire portions 41.

In repositioning panel structure 29 from the baby seat arrangement of FIG. 4 to the leg hole closure arrangement of FIG. 3, the user simply folds the distal panel 35 downwardly onto the panel 30 and swings the folded panel arrangement to the disposition of FIG. 3.

A handle 42 is provided on the rear portion 14 of basket 13 in the conventional manner.

The foregoing disclosure of specific embodiments is illustrative of the broad inventive concepts comprehended by the invention.

I claim:

1. In a shopping cart having a wheeled frame and a basket carried on the frame and defining a horizontal rear seat portion and an upright rear wall having leg holes for passing rearwardly therethrough the legs of a baby sitting on said rear seat portion in a baby seat at the rear of the basket, the improvement comprising:
   wall means;
   mounting means swingably mounting said wall means to said basket for disposing the wall means to selectively define
   (a) a seat back upstanding from said rear seat portion for supporting the back of a baby sitting in said baby seat space with the legs of the baby extending rearwardly through said leg holes, and
   (b) a downwardly hanging leg hole closure for closing said leg holes with said baby seat space opening forwardly in said basket whereby the entire basket may be used to receive objects and passage of such objects rearwardly through said leg holes from the gasket is effectively prevented, said mounting means comprising a first panel pivotally connected to said basket forwardly closely spaced from said rear wall, and said wall means comprising a second panel pivotally connected to said first panel to lie against said rear wall when disposed to close said leg holes, said first panel being inclined rearwardly upwardly from the said rear seat portion and said second panel hanging downwardly from said upwardly inclined first panel between said first panel and said rear wall of the basket when said wall means and mounting means are in the leg hole closing disposition.

2. In a shopping cart having a wheeled frame and a basket carried on the frame and defining a horizontal rear seat portion and an upright rear wall having leg holes for passing rearwardly therethrough the legs of a baby sitting on said rear seat portion in a baby seat space at the rear of the basket, the improvement comprising:
   wall means mounted to said basket for selectively defining
   (a) a substantially continuous support wall selectively overlying said rear seat portion of the basket in a seat-forming disposition for supporting a baby's buttocks and a seat back upstanding from said support wall for supporting the back of a baby sitting in said baby seat space with the legs of the baby extending rearwardly through said leg holes, and
   (b) said back defining a leg hole closure hanging downwardly from said support wall with said support wall upstanding from said rear seat portion of the basket for closing said leg holes, said baby seat space opening forwardly in said basket when said support wall and seat back are arranged in the leg hole closing disposition whereby the entire basket may be used to receive objects and passage of such objects rearwardly through said leg holes from the basket is effectively prevented.

3. The shopping cart of claim 2 wherein said seat back comprises a plurality of spaced wires.

4. The shopping cart of claim 2 wherein said support surface is defined by a panel formed of synthetic resin.

5. The shopping cart of claim 2 wherein said support wall is defined by a panel formed of synthetic resin and said seat back comprises a panel of metal.

6. The shopping cart of claim 2 including pivot means for pivotally mounting said support wall to the basket.

7. The shopping cart of claim 2 including pivot means for pivotally mounting said support wall to the basket adjacent said rear wall of the basket.

8. The shopping cart of claim 2 wherein said support wall comprises a panel pivotally mounted to the basket.

9. The shopping cart of claim 2 wherein said support wall comprises a panel pivotally mounted to the basket, said panel and support wall cooperatively defining a bifold structure.

10. The shopping cart of claim 2 wherein said support wall comprises a panel pivotally mounted to the basket adjacent said rear wall of the basket.

11. The shopping cart of claim 2 wherein said support wall comprises a panel pivotally mounted to the basket and to said support wall.

12. The shopping cart of claim 2 wherein said support wall comprises a panel pivotally mounted to the basket closely spaced from said rear wall of the basket.

13. The shopping cart of claim 2 wherein said seat back is disposed substantially at said rear wall of the basket in said leg hole closing disposition.

14. The shopping cart of claim 2 further including stop means at a front end of said seat space, said seat back engaging said stop means when supporting the back of the baby.

15. The shopping cart of claim 14 wherein said stop means is vertically elongate.

16. The shopping cart of claim 14 wherein said stop means comprises vertical wires at opposite sides of the basket.

17. The shopping cart of claim 2 further including stop means at a front end of said baby seat space, said seat back defining a distal edge portion engaging said stop means, said seat back engaging said stop means when supporting the back of the baby.

18. The shopping cart of claim 2 wherein said support wall defines a substantially continuous sheet member.

19. The shopping cart of claim 2 wherein said support wall defines a substantially continuous sheet member formed of synthetic resin.

20. The shopping cart of claim 2 wherein said seat back defines a second means for closing said leg holes in the leg hole closing disposition of said wall means.

* * * * *